United States Patent [19]

Srivatsa et al.

[11] Patent Number: 4,587,023

[45] Date of Patent: May 6, 1986

[54] CONTROL SYSTEM FOR A PROCESS

[75] Inventors: Sanjay R. Srivatsa, Naperville; Robert L. Wetegrove, Winfield; Robert R. Patzelt, Oak Lawn, all of Ill.

[73] Assignee: Nalco Chemical Company, Oak Brook, Ill.

[21] Appl. No.: 646,251

[22] Filed: Aug. 31, 1984

[51] Int. Cl.$^4$ .................................................. B01D 33/04
[52] U.S. Cl. .................................... 210/744; 210/783; 210/101
[58] Field of Search .................... 210/96.1, 101, 103, 210/193, 401, 738–746

[56] References Cited

U.S. PATENT DOCUMENTS

| | | | |
|---|---|---|---|
| 3,693,797 | 9/1972 | Topol | 210/193 |
| 4,118,778 | 10/1978 | Strub | 210/193 |
| 4,267,060 | 5/1981 | Miller | 210/103 |
| 4,336,143 | 6/1982 | Abbott | 210/96.1 |
| 4,341,628 | 7/1982 | Fujinami et al. | 210/401 |
| 4,349,435 | 9/1982 | Ochiai | 210/96.1 |
| 4,394,262 | 7/1983 | Bukowski et al. | 210/103 |

OTHER PUBLICATIONS

Industrial Instruments for Measurement and Control by Rhodes, McGraw-Hill Book Co., New York, pp. 406–411, 1941.

Primary Examiner—John Adee
Attorney, Agent, or Firm—Kinzer, Plyer, Dorn & McEachran

[57] ABSTRACT

A perturbed feedback control system for a process. Inputs to the process include a feed stream and a manipulated variable. The manipulated variable is controlled by a feedback controller. Measurements of a parameter measured "downstream" of the process are taken periodically and fed back to the controller. The feedback controller generates a control response on the basis of a comparison of the two most recent values of the downstream parameter. The comparison is made by calculating a perturbed set point which includes the values of the downstream parameter taken at the two most recent sampling periods. In a specific embodiment, the perturbed set point also includes measurements of the most recent and preceding values of the manipulated variable. A control response is applied to the manipulated variable by the feedback controller based on the value of the perturbed set point. The control system has been applied to optimize the feed rate of chemicals for sludge dewatering on a twin belt filter press.

10 Claims, 7 Drawing Figures

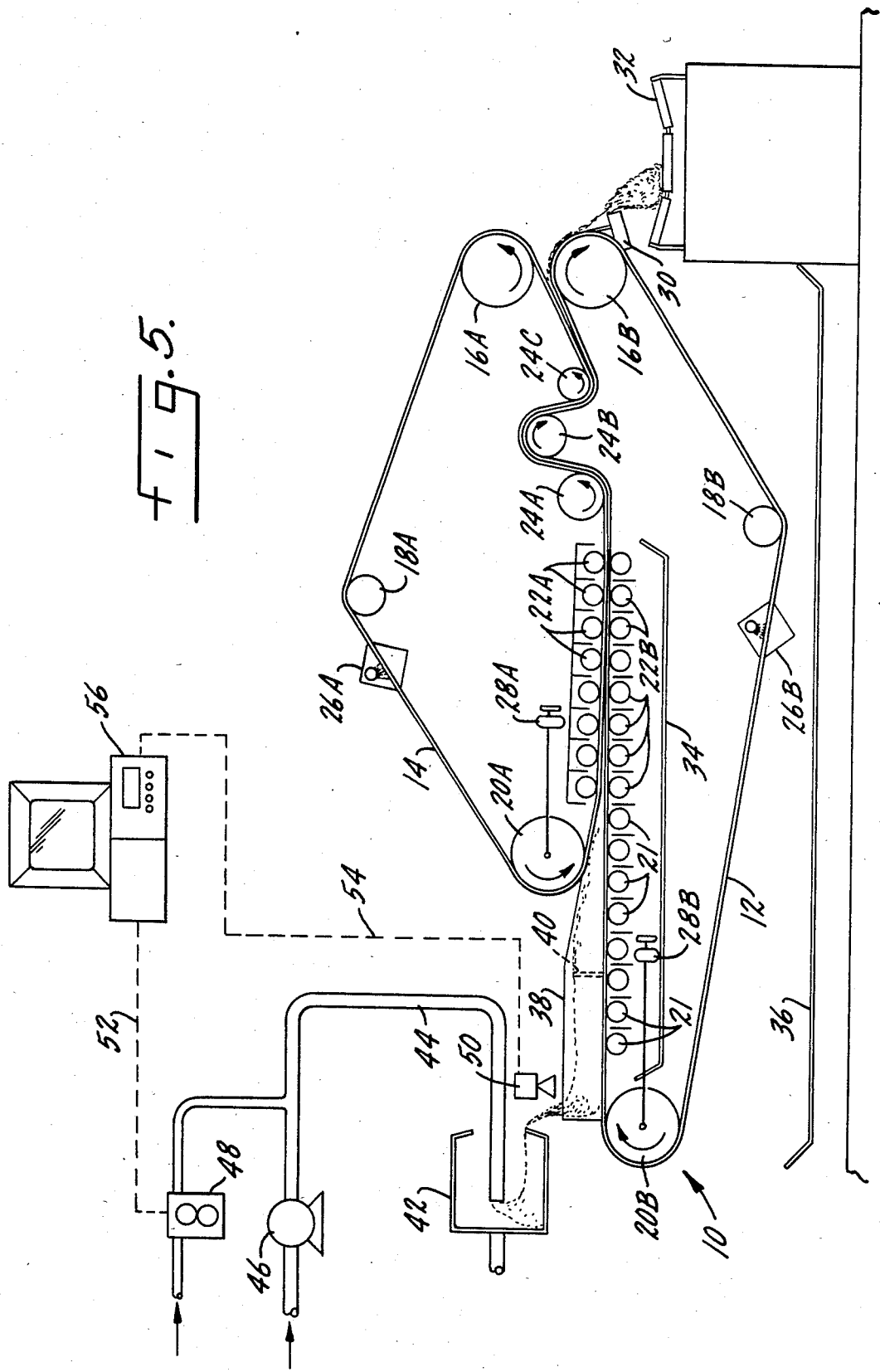

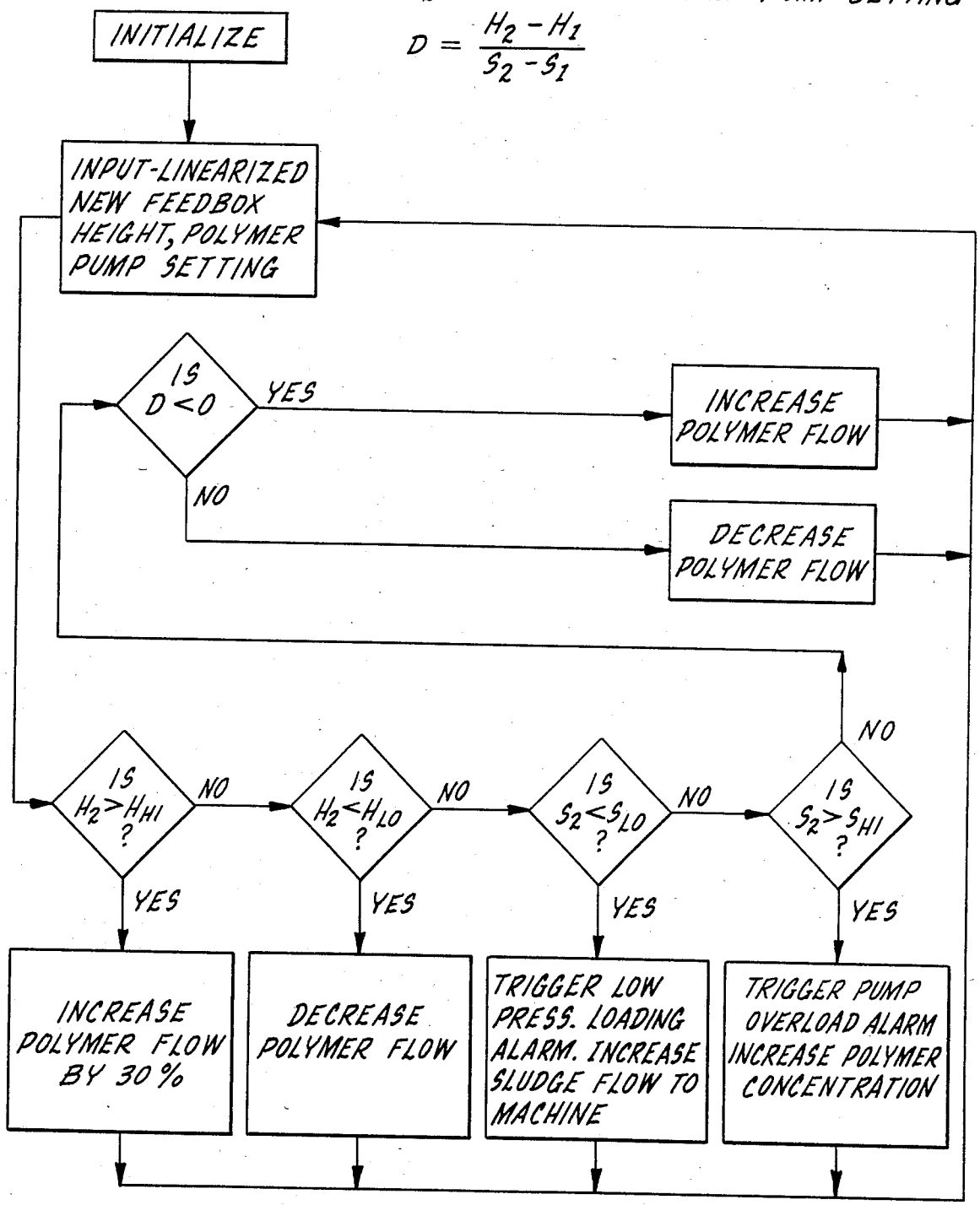

CONTROL SYSTEM FOR A PROCESS

SUMMARY OF THE INVENTION

This invention relates to an automatic control system for a process. The invention is particularly applicable to an automatic polymer feeder for sludge dewatering on a twin belt filter press, although it is not to be limited to this application.

A primary object of the invention is a control system which is operable on processes which do not have a defined, absolute set point.

Another object is a control system which is stable under varying process conditions.

Another object of the invention is a control system which utilizes simple and easily maintained instrumentation.

Another object of the invention is a control system having fast response to various upset conditions.

A specific object of the invention is a control system which optimizes the use of chemicals for sludge dewatering on a twin belt filter press.

These and other objects will become apparent in the following description, claims and drawings.

BRIEF DESCRIPTION OF THE DRAWINGS

FIG. 5 is a schematic side elevation view of a typical twin belt filter press used for sludge dewatering, together with components of the control system.

FIG. 7 is a block diagram of the control logic of the present invention as applied to a twin belt filter press.

DETAILED DESCRIPTION OF THE INVENTION

This invention relates to a control system for a process. It is intended for any process for which the concept of an absolute set point is inadmissible. The control system of the invention has been found to be particularly useful for controlling the process of dewatering sludge on a twin belt filter press. This type of device is used, for example, in municipal and paper mill sludge dewatering applications. The control system of the present invention provides an automatic treatment chemical feeder package which optimizes product dosage in order to maintain acceptable performance at reduced costs. The control system reduces downtime and provides economic usage of the treatment chemical.

Figure 1:
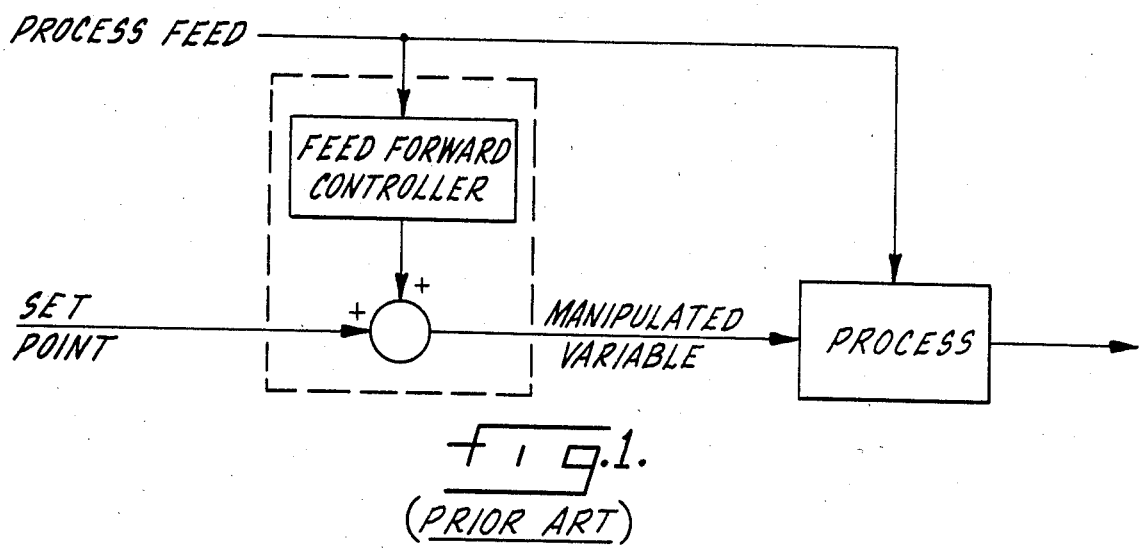
FIG. 1 is a schematic representation of a prior art feed forward controller.
Figure 2:
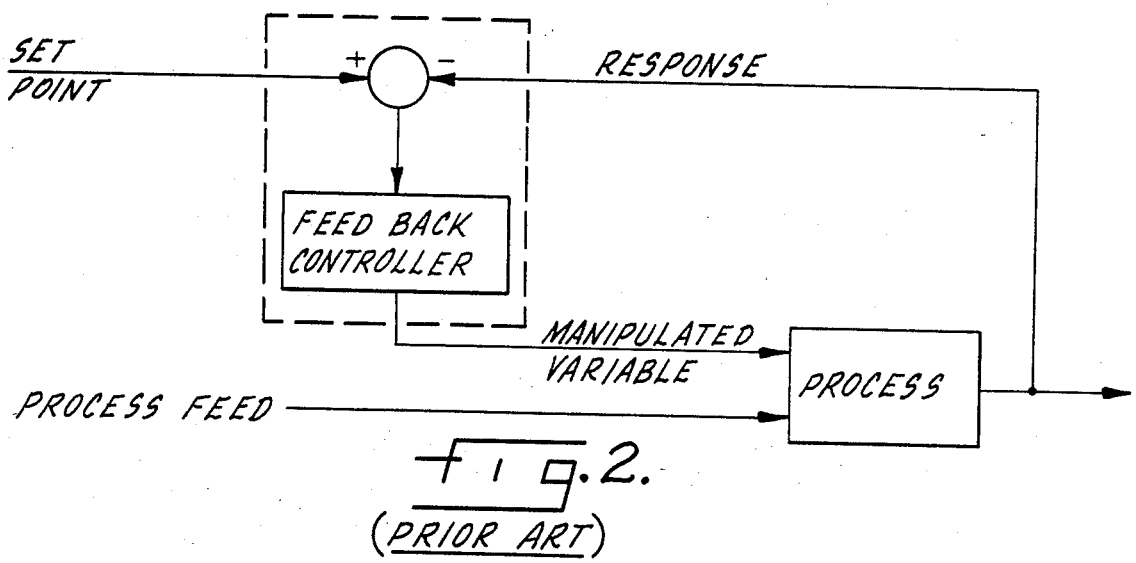
FIG. 2 is a schematic representation of a prior art feedback controller.

FIGS. 1 and 2 are devoted to definitions in basic control theory. FIG. 1 depicts a standard feed forward control loop. Here, the system is maintained under control by monitoring a variable in the process feed before it reaches the process itself. In response to this measurement, another variable or stream is predictively manipulated with reference to a fixed set point to counter the effect caused by the measured variable. Examples of this type of control loop can be found in processes where control is maintained by monitoring variables such as viscosity, density and concentration.

FIG. 2 describes a standard feedback control loop. Just as the name implies, control is achieved by monitoring a measured variable fed back from the process, i.e., it is measured "downstream" of the process. In response to this measured variable, the feedback controller manipulates another variable or stream with respect to a fixed set point to correct for the change detected in the measured variable (in feedback loops the measured variable is also termed the "response". Also, the corrective action administered by a controller is called the "control response"). Examples of this type of control loop can be found in processes having a need for controlling temperature, pressure and pH. Corrective action in feedback systems is much slower than feed forward systems as the former depends upon various process lags and requires linearization of the measured variable. One of the major drawbacks in a feed forward system is that it functions efficiently only for well defined set points and predictive correlations between the manipulated and measured variables.

Figure 3:
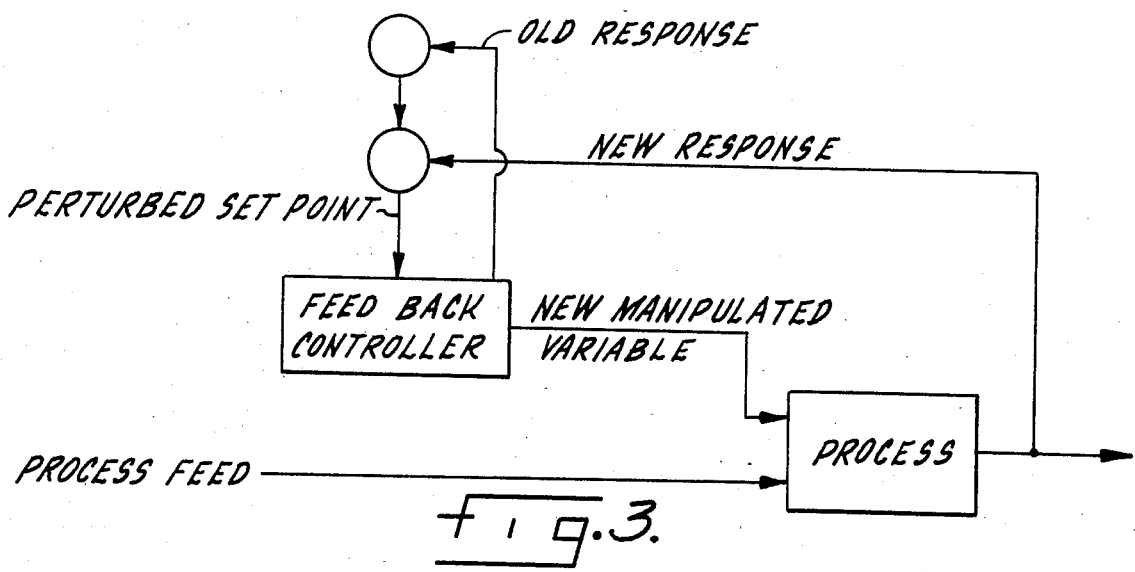
FIG. 3 is a schematic diagram of a perturbed feedback controller, according to the present invention.

For systems such as a polymer feed control for twin belt filter presses, the concept of absolute set points is inadmissible. This is due to the continuous variations occurring in the sludge feed. The present invention provides a new method of control for such a system. It is aptly termed a perturbed feedback control loop. It is illustrated in FIG. 3 and operates as follows. Measurements of a downstream parameter are taken periodically and fed to a feedback controller. After initialization, a first reading of that parameter (the "response") is supplied to the feedback controller. The controller then applies a control response to the process, i.e., it changes or "tweaks" an input to the process. After an appropriate time interval, a second reading of the response is fed to the controller. It compares the first and second values of the response to see if the effect of the change was salutary. If it was, the controller again applies the same change to the process. This procedure continues iteratively with the last or new measurement of the response being compared to the next-to-last or old response. So long as the effect of the change is favorable, the controller keeps applying that change. When the process exhibits an unfavorable reaction to a control response, a different control response is applied to the process and the control procedure then continues as before. It can be seen that this control system is similar to a feedback control loop in that a response is measured downstream of the process and fed back to the controller. But, unlike the standard feedback loop, the control system of the invention does not have a fixed set point in the true sense of the word. Rather, the control system of the invention uses a dynamic or "quasi" set point. Comparison of the new and old responses determines the next control response. Thus, control is based on the direction the process is heading, rather than on where it is.

The control system as just described qualitatively can be quantified so as to be suitable for use with a computer. The step of comparing the last two responses is realized by calculating a quantity which will be called a perturbed set point. This is a mathematical expression whose factors include the last two responses. There may be additional factors but at least these two are required. The perturbed set point may simply be the difference between the responses, or it could be a ratio of the responses, or some other mathematical expression correlating the responses in a manner suitable for the particular process.

The step of deciding whether the reaction of the process to a control response is favorable or unfavorable is realized by testing the value of the perturbed set point. To illustrate this, consider a hypothetical process having no fixed set point and where the parameter used for the response has to be maximized. So an increase in the response would be considered favorable. In such a case, the perturbed set point could be defined as the difference between the new and the old responses. Determining whether that difference is positive or negative will reveal whether the response is favorable or unfavorable. So simply determining that the perturbed set point is greater than zero indicates the reaction of the process to the last control response was favorable. Consequently, the controller in the hypothetical process would repeat the last control response. Conversely, a perturbed set point less than zero indicates an unfavorable reaction and so a different control response would next be applied to the hypothetical process. It is to be understood that if a process parameter were to be minimized the action of the controller will be reversed.

Figure 4:
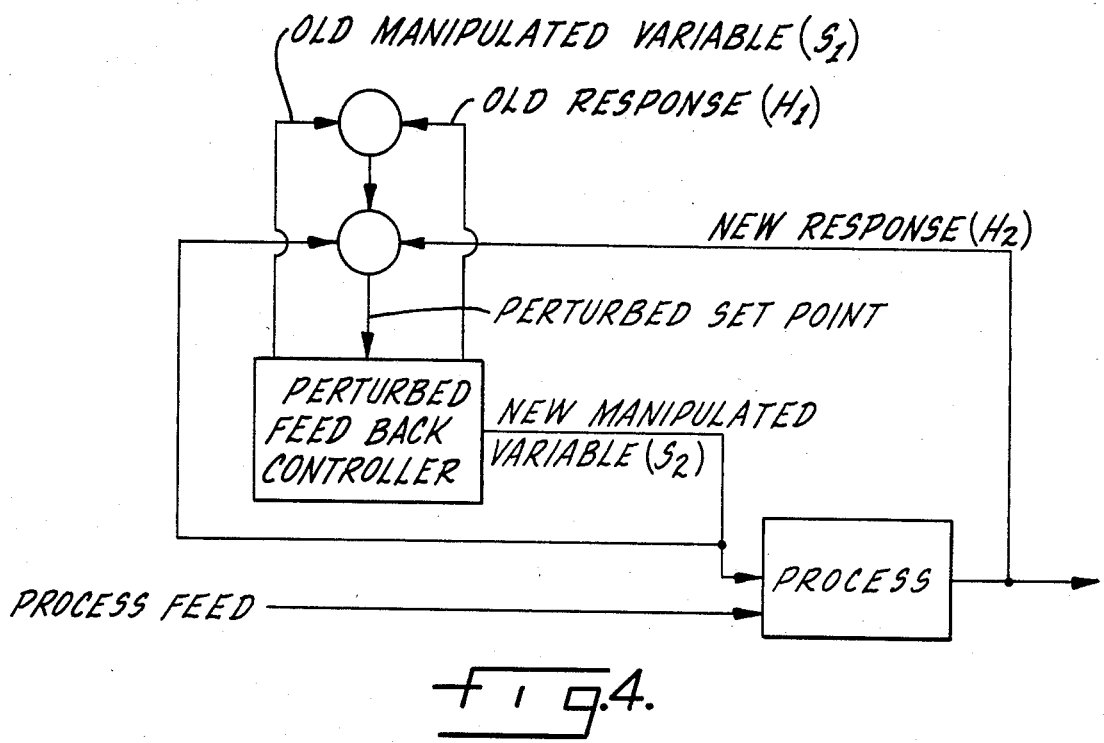
FIG. 4 is a schematic diagram of a perturbed feedback controller according to a specific embodiment of the present invention.

FIG. 4 illustrates the invention as applied specifically to a twin belt filter press for sludge dewatering. The factors defining the perturbed set point include not only the previous or old measured variable (i.e. the old response) and the new response but also the most recent value of the manipulated variable and the value of the old manipulated variable, i.e., the next-to-last measurement of the manipulated variable. With these inputs defining the perturbed set point, the feedback controller forms a control response based on the ratio of the change in the measured variable to the change in the manipulated variable. This is highly advantageous on the twin belt filter press for reasons which are explained below.

A twin belt filter press is shown diagrammatically in FIG. 5 at 10. The machine has a frame which supports a lower belt 12 and an upper belt 14. The belts are made of either a woven synthetic fiber or a relatively coarse mesh stainless steel fabric. The upper and lower belts 12 and 14 travel in endless fashion about upper and lower drive rolls 16A, 16B, tracking rolls 18A, 18B and breast rolls 20A, 20B, respectively. A plurality of support rollers 21 maintain the lower belt 12 through the free or gravity drainage zone. A plurality of upper and lower intermediate rollers 22A, 22B define the wedge zone. Rollers 24A, 24B, 24C define the high pressure zone. The belts are cleaned by spray nozzles 26A, 26B. Belt tensioning devices 28A, 28B are provided at the breast rolls 20A, 20B. A doctor blade 30 removes dewatered sludge or cake from the lower belt 12. The dewatered sludge or cake falls onto a discharge conveyor 32. An upper drain pan 34 catches the filtrate as it drains by gravity in the free drainage zone. A bottom drain pan 36 receives any filtrate overflow from the upper drain pan and also catches the wash water from the spray nozzles 26A, 26B.

A feedbox 38 is mounted above the lower belt 12 in the gravity drainage zone. The feedbox is a three-sided enclosure, open on the top, bottom and right end (as seen in FIG. 5). An optional, partial weir 40 may be included. The feedbox retains the flocculated sludge on the belt until it dewaters and reaches a non-fluid consistency suitable for the wedge zone. A rotary drum flocculator or mixing tank 42 supplies flocculated sludge to the feedbox 38. The flocculator assures complete mixing of the treatment chemical or polymer and the sludge feed. The flocculator 42 receives sludge and polymer through a feed pipe 44.

A sludge feed pump 46 is connected to the sludge feed line 44. As shown the pump 46 would be controlled manually by plant operators but automatic control by the perturbed feedback controller could also be used. A gear pump 48 for the polymer has an SCR drive and is controlled by the perturbed feedback controller. An ultrasonic level indicator 50 is associated with the feedbox 38 to measure the height of the flocculated sludge in the feedbox. It will be understood that any type of level detector could be used. The polymer pump 48 and level indicator 50 are connected by electrical lines 52 and 54 to a perturbed feedback controller 56. The perturbed feedback controller 56 is also supplied with the polymer concentration so that, together with the polymer pump speed data, the polymer flow can be calculated. It has been found that a suitable response parameter for use in the perturbed feedback controller as applied to a twin belt filter press is the hydrostatic level in the sludge feedbox. The hydrostatic level or feedbox height is extremely sensitive to polymer dose. If the polymer is underdosed, the box height increases as a result of poor drainage. If left unchecked, this would result in a box overflow and subsequent press shutdown. In contrast, upon overdosing polymer, the box height falls below normal running level due to increased drainage. This increased drainage at the expense of excess polymer is not desirable as it does not improve overall performance. Thus, a level monitor on the feedbox provides a suitable process response.

Figure 6:
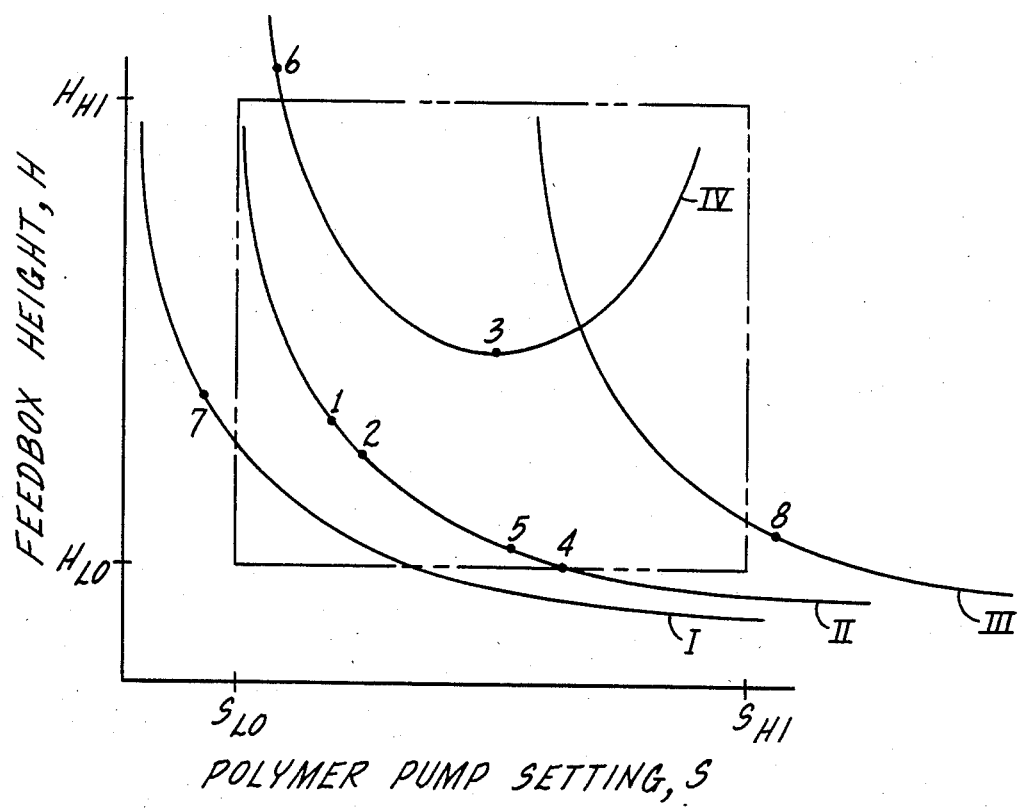
FIG. 6 is a graph of typical response curves for the system of FIG. 5.

Since in this application it is desired to optimize the polymer flow, the response parameter is plotted against polymer flow to determine the optimum operating point. This has been done in FIG. 6 where four possible response curves are shown, to illustrate varying operating conditions. It will be noted that the abscissa in FIG. 6 is actually polymer pump setting which is indicative of the available speed range of the polymer pump. Since the pump speed is the variable actually controlled by the feedback controller and since the limits of the pump speed range must be observed in any event, the pump setting is used on the graph. Also, the actual polymer flow is proportional to the pump setting so the curves would be shaped the same whether the abscissa was pump setting or actual polymer flow. Further the polymer flow could be calculated from the polymer concentration and the pump setting. FIG. 6 shows four separate response curves. The exponential decay curves labeled I, II, III are typical curves which might be found in a sewage treatment plant operating under varying conditions. Curve IV is typical for a paper mill application.

The following analysis illustrates the logic of the perturbed feedback controller applied to a twin belt filter press. The controller acquires data from the level detector and polymer pump at successive sampling periods or time intervals. Consider a system operating on curve II. Suppose the most recent or last measurements were at point 2 and the next-to-last measurements were at point 1. A perturbed set point "D" is defined as the change in feedbox height (H) with respect to the change in polymer pump setting (S). Thus, "D" represents the slope of the line connecting points 1 and 2. The control system monitors the level in the sludge feedbox and evaluates "D" at each control interval. A negative value for "D" represents inadequate polymer flow. The control system compensates for this by increasing the pump speed and thereby increasing the polymer flow, by a suitable amount. For example, in a particular system it may be sufficient to increase the pump setting by 10%. On the other hand, a positive value of "D" indicates polymer overdose and this is compensated for by decreasing the pump setting a suitable amount, for example 10% or 20%.

It will be noted that curve IV has a well defined optimum point, indicated at 3. The logic described above will drive the system toward this optimum point and then it will oscillate on either side of the point once it is reached. The exponential curves I, II, III do not have a natural optimum point. The value for "D" in these cases will always be negative and the above-described logic would always continue to increase the polymer flow. However, after a certain point is reached, this additional polymer flow does not result in increased drainage sufficient to justify the use of that extra polymer. Therefore, the controller of the present invention incorporates several threshold parameters which override the normal control logic described above. The first of these is a feedbox low level ($H_{lo}$). This condition is set at an acceptable plant performance specification with respect to the feedbox height. When the last measurement taken shows the feedbox height has fallen below $H_{lo}$ the controller defaults from its normal control response and automatically decreases the polymer pump setting by a suitable amount. For example, the polymer flow may be decreased by 10%. Using the example of curve II, this occurs at the point labeled 4. The control response would be to decrease the polymer flow which would drive the system back to, say, point 5. When the next control interval readings are taken at point 5 the value of H will be above $H_{lo}$ and the normal control will return and in this case the value of "D" will be negative and the polymer flow will again be increased.

It can be seen that the system will oscillate in the vicinity of point 4. Thus, needless lowering of the box height at the expense of additional polymer is inhibited. This feature provides for long term polymer savings.

The next threshold condition is a feedbox maximum height ($H_{hi}$). This condition is set near the maximum box height. Here, polymer flow is increased by a large amount, perhaps 30%, as needed for one control interval to prevent the feedbox from overflowing and to maintain control of the process. Looking at FIG. 6, curve IV, a reading taken at point 6 would show the maximum box height $H_{hi}$ has been exceeded and the polymer flow would be increased to drive the system in the direction of point 3.

The next threshold is concerned with the polymer flow. A very low polymer pump setting indicates insufficient sludge flow to the twin belt filter press. A low polymer flow level ($S_{lo}$) is a setting below 10% of the polymer pump range. This indicates low solids loading on the machine. The condition triggers a low "press loading" alarm. Corrective action is rendered by increasing the sludge throughput to the press. A reading at point 7 on curve I would trigger this alarm.

The last threshold setting is a high polymer flow limit ($S_{hi}$). This is a setting at 100% of the polymer pump range to indicate flow saturation. The condition triggers a "polymer pump overload" alarm. Corrective action is rendered by increasing the polymer concentration. A reading at point 8 on curve III would trigger this alarm. The effect of increasing the polymer concentration would be to shift the entire curve III to the left, in the direction of curve II.

FIG. 7 shows a block diagram of the logic applied by the control system of the present invention. In this diagram a subscript 2 indicates a value at the last measurement period and a subscript 1 indicates a value at the next-to-last period. It has been found that this logic can be applied using a Hewlett-Packard HP 85/3497 microcomputer and data acquisition unit. The microcomputer then serves as the perturbed feedback controller 56 of FIG. 5. Also, it will be understood by those skilled in the arts of sludge dewatering, process controls and computer programming that the raw data acquired from the instrumentation must be linearized. This may be accomplished by performing a regression on the level transducer output and the real bed height. The real bed height is the level of the flocculated sludge in the feedbox. It is measured with a ruler. During the process, transducer impulses are statistically averaged and related to real bed height.

Looking now at FIG. 7, after initializing the control system by taking the first readings of the variables, the control system thereafter periodically takes new readings of the various parameters. These readings are fed into the microcomputer and linearized. The various thresholds are then tested and the appropriate corrective action taken if any of them are exceeded. If none of the thresholds apply, then the perturbed set point "D" is calculated as described above and shown in the legend of FIG. 7. If the perturbed set point is positive or zero, the polymer flow is decreased. If the perturbed set point is negative, the flow is increased. After the appropriate cycle time new readings of the variables are taken and fed to the computer and the control cycle repeats itself.

It can be seen that the described procedure of FIG. 7 incorporates the perturbed feedback control technique of FIG. 4. The old and new values of the response $H_1$ and $H_2$ and the old and new values of the manipulated variable $S_1$ and $S_2$ comprise the perturbed set point. The perturbed set point is calculated by the feedback controller. The controller then formulates the appropriate control response. When the next set of readings are taken, the new readings become the new values of $S_2$ and $H_2$ while the previous values of $H_2$ and $S_2$ are substituted for $H_1$ and $S_1$.

There are at least two ways to initialize the control system and choose the first polymer dosage. Either method could be used in the present invention. One way is to run a bench test of the process and generate an approximate dosage curve. From this a first guess at an optimum can be chosen and operation can start with the polymer at that dosage. The other method is to choose a very low polymer dosage, one that is certain to be too low, and let the control system drive the dosage to the optimization point.

While the invention has been described in general terms and with reference to one specific application it will be understood that other applications for the invention could be devised and that alterations could be made to the specific form shown. Therefore, the invention is not to be limited to the described forms. Rather it is to be limited only by the scope of the following claims.

We claim:

1. In a control system for a process, the process being supplied with a feed stream and a manipulated variable, the control system including a feedback controller, and means for periodically measuring a response downstream of the process and supplying said measurement to the feedback controller, the feedback controller applying a corrective action to the manipulated variable, an improved method of operating the control system on processes not having a fixed set point, comprising the steps of:

(a) taking a first measurement of the response;
(b) applying a control response to the process;
(c) taking a second measurement of the response at the same location as the first response;
(d) comparing the first and second measurements of the response; and
(e) repeating the control response of step (b) if the comparison of step (d) is favorable and applying a different control response if the comparison is unfavorable.

2. The method of claim 1 wherein the comparison of the first and second measurements of the response is made by calculating a perturbed set point using at least the first and second measurements of the response as factors in the perturbed set point.

3. The method of claim 2 wherein the determination of whether the comparison of step (d) is favorable or unfavorable is made by evaluating the perturbed set point with respect to a predetermined value.

4. The method of claim 1 further comprising the step of successively repeating steps (c) through (e) while treating the previous second measurement as a first measure-ment.

5. The method of claim 1 further comprising the steps of taking first and second measurements of the manipulated variable at the times of taking the first and second measurements of the response, respectively, and using the measurements of the manipulated variable in the comparison of the first and second responses.

6. The method of claim 1 further comprising the step of testing the second measurement of the response against a predetermined threshold and defaulting to an alternate control response if the threshold is exceeded.

7. The method of claim 5 further comprising the step of testing the second measurement of the manipulated variable against a predetermined threshold and defaulting to an alternate control response if the threshold is exceeded.

8. In a twin belt filter press of the type used for sludge dewatering, including a conditioning tank in which treatment chemicals are mixed with the feed sludge and a feedbox mounted above a belt in the gravity drainage zone, a method of controlling the flow rate of treatment chemicals, comprising the steps of:

(a) taking first measurements of the chemical flow rate and the height of the sludge in the feedbox,
(b) taking second measurements of the chemical flow rate and the height of the sludge in the feedbox, the second measurements following the first measurements by a time period,
(c) calculating the ratio of the change in feedbox height to the change in chemical flow rates,
(d) increasing the chemical flow rate if said ratio is negative or decreasing the chemical flow rate if said ratio is positive or zero, and
(e) successively repeating steps (b)–(d) while treating the previously second measurement as a first measurement.

9. The method of claim 8 further comprising the step of testing the second measurement of the chemical flow rate against predetermined high and low thresholds and increasing chemical concentration if the high threshold is exceeded and increasing sludge feed if the flow threshold is not met.

10. The method of claim 8 further comprising the step of testing the second measurement of the feedbox height against predetermined high and low thresholds and increasing the chemical flow rate if the high threshold is exceeded and decreasing the chemical flow rate if the low threshold is not met.

* * * * *